United States Patent [19]

Kawada

[11] 3,743,868

[45] July 3, 1973

[54] DRIVING APPARATUS FOR PIEZOELECTRIC CERAMIC ELEMENTS

[75] Inventor: Takehiko Kawada, Naka-ku, Kanagawa Prefecture, Yokohama, Japan

[73] Assignee: Denki Onkyo Company, Ltd., Tokyo, Japan

[22] Filed: Oct. 12, 1971

[21] Appl. No.: 188,299

[30] Foreign Application Priority Data

Oct. 12, 1970 Japan ............................. 45/89811
Dec. 25, 1970 Japan ............................. 45/116287

[52] U.S. Cl. .................... 310/8.1, 310/9.8, 318/118, 331/116, 331/158

[51] Int. Cl. .............................. H04r 17/00

[58] Field of Search .................... 310/8, 8.1, 26, 9.7, 310/9.8; 318/116, 118; 331/116, 158, 164, 186, 109, 65

[56] References Cited

UNITED STATES PATENTS

| | | | |
|---|---|---|---|
| 3,293,456 | 12/1966 | Shoh | 310/8.1 |
| 3,596,206 | 7/1971 | Loria | 310/8.1 X |
| 3,629,726 | 12/1971 | Popescu | 310/8.1 X |
| 3,500,089 | 3/1970 | Brech et al. | 310/8.1 |
| 3,432,691 | 3/1969 | Shoh | 310/8.1 |
| 3,654,540 | 4/1972 | Honig | 310/26 |
| 2,917,691 | 12/1959 | De Prisco et al. | 318/118 |
| 3,598,909 | 8/1971 | Sasaki et al. | 310/8.1 X |
| 3,117,768 | 1/1964 | Carlin | 310/8.1 X |

*Primary Examiner*—J. D. Miller
*Assistant Examiner*—Mark O. Budd
*Attorney*—Chittick, Pfund, Birch, Samuels & Gauthier

[57] ABSTRACT

In apparatus for driving a piezoelectric ceramic element by applying a driving voltage across a pair of driving electrodes of the ceramic element, there are provided a phase detector connected to one driving electrode for detecting the phase of the current flowing through the ceramic element as a voltage phase, an amplifier connected to the other driving electrode for supplying thereto a driving voltage, and a phase shifter to positively feed back the output from the phase detector to the amplifier for coinciding the voltage phase and the current phase of the ceramic element so as to drive the same at the most suitable driving frequency.

8 Claims, 15 Drawing Figures

Patented July 3, 1973 3,743,868

3 Sheets-Sheet 1

INVENTOR

TAKEHIKO KAWADA

BY Chittick, Pfund, Birch Samuels & Gauthier ATTORNEY

INVENTOR
TAKEHIKO KAWADA

BY Chittick, Pfund, Birch, Samuels & Gauthier
ATTORNEY

Patented July 3, 1973 3,743,868

3 Sheets-Sheet 3

INVENTOR

TAKEHIKO KAWADA

BY Chittick, Pfund, Birch, Samuels & Gauthier
ATTORNEY

DRIVING APPARATUS FOR PIEZOELECTRIC CERAMIC ELEMENTS

BACKGROUND OF THE INVENTION

This invention relates to apparatus for driving a piezoelectric ceramic element.

A piezoelectric ceramic element generally comprises a rectangular substrate essentially consisting of a piezoelectric substance such as barium titanate ($BaTiO_3$) or lead zirconate titanate [$Pb(ZrTi)O_3$] and a pair of driving electrodes disposed on the opposite sides of the substrate. A predetermined driving voltage is impressed across the driving electrodes for resonating the ceramic element to vibrate at the natural frequency of the substrate. It is well known in the art that the ceramic element operates at its highest efficiency when it is excited with a driving voltage having substantially the same frequency as the natural frequency. In this case, the ceramic element can be used as a source of ultrasonic oscillation, and where an output electrode is mounted on the ceramic element, it can be used as a high voltage generator.

Considering the general characteristics of a ceramic element, an equivalent circuit thereof as seen from the side of the driving electrodes may be represented by an inter-electrode capacitance Co, and a plurality of parallel connected series circuits each including an equivalent inductor Li, an equivatent capacitor Ci and an equivalent resistor Ri (where $i = 1, 2 \ldots n$), as diagrammatically shown in FIG. 1 of the accompanying drawing. Each one of the series circuits connected in parallel with the capacitance Co resonates only at a driving frequency of $n/2\ f_o$ (where $n$ is an integer, and $f_o$ represents the natural frequency of the ceramic element), thus producing a high voltage at the output side of the ceramic element where it is used as a high voltage generator. Voltage step-up action is especially remarkable when the driving frequency equals $\frac{1}{2} f_o$ or $f_o$. When the ceramic element resonates with the series circuits of the equivalent circuit shown in FIG. 1, the drive impedance of the ceramic element as seen from the driving side becomes a minimum and the phase becomes zero. Where the element resonates with a parallel circuit comprising the inter-electrode capacitance Co and the series circuits the drive impedance of the ceramic element as seen from the driving side becomes a maximum and the phase becomes zero in the same manner as the series resonance mentioned above.

Considering the phase characteristic of the ceramic element, the current phase advances $\pi/2$ with respect the the voltage phase at the non-resonance frequency, as shown in FIG. 2. However, at the resonance frequency, the phase difference between voltage and current becomes zero. As the frequency exceeds by a little the resonance frequency the voltage phase advances $\pi/2$ with respect to the current phase and both phases become zero again at the anti-resonance point. Thereafter, only the phase of the current advances.

FIG. 3 illustrates curves showing the relationship between the frequency and the drive impedance characteristic Zi and the voltage step-up ratio Vo/Vi in which the curve $a$ represents the drive impedance characteristic which becomes minimum at resonance frequencies $\frac{1}{2} f_o$, $f_o$ . . . and becomes maximum at the anti-resonance frequencies. Like the drive impedance characteristic, the voltage step-up characteristic $b$ becomes maximum at the resonance frequencies.

In other words, the ceramic element provides the maximum voltage step-up ratio at the resonance frequency (or natural frequency of vibration) and the drive impedance at this time as seen from the driving side becomes minimum. Moreover, the phases of the voltage and current impressed across the ceramic element become equal.

However, the natural frequency of the ceramic element varies in dependence upon the temperature of the ceramic element itself (that is the ambient temperature and the heat generated in the element by the operation thereof), the error in the configuration of the ceramic element, load variation and the DC voltage applied across the driving electrodes. This tendency is especially remarkable when the ceramic element is driven at a frequency different from the natural frequency thereof. Furthermore, a phase difference will appear between the applied driving voltage and the current flowing through the ceramic element, thus deviating from the most suitable driving frequency (that is the frequency providing the highest conversion frequency) and the most suitable phase which are determined under a definite temperature condition whereby the output of the ceramic element is greatly reduced.

The result of experiment shows that the resonance frequency of the ceramic element increases with the temperature thereof as shown in FIG. 4 and also with the load $R_L$ as shown in FIG. 5.

SUMMARY OF THE INVENTION

It is therefore an object of this invention to provide an improved apparatus for driving a piezoelectric ceramic element.

Another object of this invention is to provide a novel driving apparatus capable of operating a piezoelectric ceramic element at a high efficiency.

Still another object of this invention is to provide a driving apparatus for a piezoelectric element for causing it to operate stably irrespective of the variation in the operating conditions.

A further object of this invention is to provide apparatus for driving a piezoelectric ceramic element which has a simplified construction but can operate the element at a high efficiency.

According to this invention for use with a piezoelectric ceramic element including a pair of driving electrodes for applying a driving voltage across the driving electrodes to cause the piezoelectric ceramic element to resonate at the natural frequency thereof, there is provided driving apparatus comprising a phase detector connected to one driving electrode for detecting the phase of the current flowing through the ceramic element as a voltage phase, an amplifier connected to the other driving electrode for supplying thereto a driving voltage, and a phase shifter to positively feed back the output from the phase detector to the amplifier for coinciding the voltage phase and the current phase of the ceramic element so as to drive the same at the most suitable driving frequency.

BRIEF DESCRIPTION OF THE DRAWINGS

Further objects and advantages of the invention will become apparent from the following detailed description taken in connection with the accompanying drawing in which.

DESCRIPTION OF THE PREFERRED EMBODIMENTS

Figure 1:
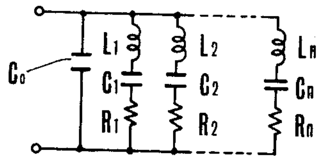
FIG. 1 shows an equivalent circuit of a piezoelectric ceramic element as viewed from the side of the driving electrodes.
Figure 2:
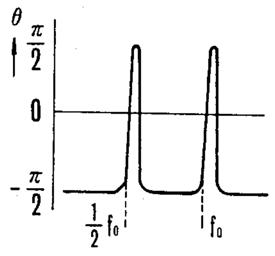
FIG. 2 is a graph showing a frequency-phase characteristic of a piezoelectric ceramic element.
Figure 3:
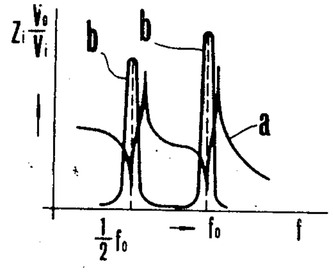
FIG. 3 shows a drive impedance characteristic (curve $a$) and a voltage step-up characteristic (curve $b$) of a piezoelectric ceramic element.
Figure 4:
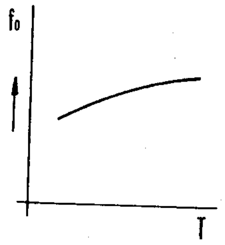
FIG. 4 is a plot showing a resonance frequency-temperature characteristic of a piezoelectric ceramic element.
Figure 5:
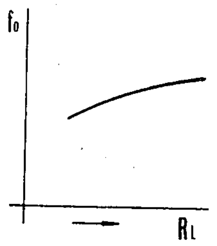
FIG. 5 is a plot showing a resonance frequency-load characteristic of a piezoelectric ceramic element.
Figure 6:
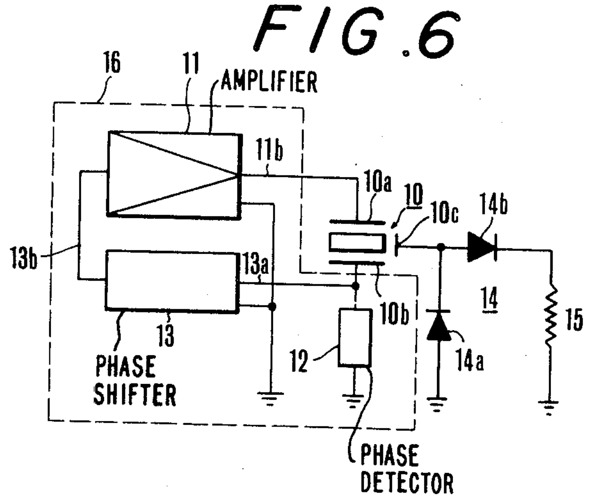
FIG. 6 is a connection diagram of one embodiment of the novel apparatus for driving a piezoelectric ceramic element.

In FIG. 6 of the accompanying drawing, there is shown a preferred embodiment of the novel apparatus for driving a piezoelectric ceramic element, more particularly a self excitation oscillation driving apparatus for a piezoelectric ceramic element constructed to act as a high voltage generator. The ceramic element 10 shown in this figure comprises a pair of driving electrodes 10*a* and 10*b* and an output electrode 10*c*. The arrangement of the electrodes simplifies the construction of the ceramic element and of the associated circuit. One of the driving electrodes 10*a* is connected to the output terminal 11*b* of an amplifier 11 which may be a conventional amplifier circuit comprised by a transistor or a vacuum tube. However, in order to improve the transmission efficiency a B-class or an AB-class amplifier circuit is preferred. The other driving electrode 10*b* is connected to a phase detector 12. The phase detector 12 includes a resistance or a reactance element of a value which does not provide a load division effect when the ceramic element is driven. Thus for example, where the ceramic element has a resistance of about 600 ohms, the phase detector is designed to have a resistance of less than 50 ohms. The driving electrode 10*b* is also connected to the input terminal 13*a* of a phase shifter 13 with its other side 13*b* connected to the input terminal of amplifier 11.

The purpose of phase shifter 13 is to compensate for the lead or lag of the phase of the current flowing through ceramic element 10 with respect to the phase of the output voltage from amplifier 11, thereby operating the ceramic member 10 at the point of zero phase difference. Preferably, it is advantageous to so construct the phase shifter 13 that it compares the phase of the driving voltage applied across the ceramic member with the phase of the current flowing therethrough while at the same time can adjust the degree of lead or lag in the phase. The output electrode 10*c* of the ceramic element 10 is connected to a load 15 via a rectifier circuit 14 comprising diodes 14*a* and 14*b*.

Above described phase detector 12, amplifier 11 and phase shifter 13 cooperate to constitute the novel driving apparatus 16 for the ceramic element.

The driving apparatus described above operates as follows;

The current flowing through the ceramic element 10 is detected as the voltage appearing across phase detector 12, and this voltage is fed back positively to amplifier 11 through phase shifter 13. Accordingly the driving apparatus 16 comprising amplifier 11 and phase shifter 12 undergoes a self-excited oscillation thus causing the ceramic element 10 to vibrate at the natural frequency thereof which is the most suitable driving frequency. Under these conditions, it is possible to make equal the phase of the driving voltage of the ceramic element and the phase of the current flowing therethrough because it is possible to set the (phase shift) of an LC or RC circuit constituting the phase shifter 13 to be sufficiently smaller than the $\theta$ (phase shift) of the ceramic transformer.

Figure 7:
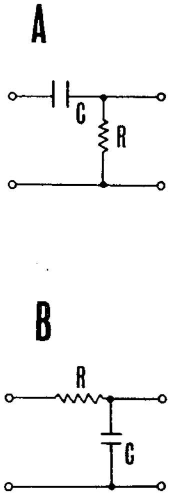
FIGS. 7A and 7B show different examples of the phase shifter.

When the operating conditions for the continuous operation of the ceramic member are preset, it is possible to construct the phase shifter as a simple combination of a capacitor and a resistor as shown in FIGS. 7A and 7B.

According to this invention it is also possible to compensate for the phase lag caused by amplifier 11 by the action of phase shifter 13. Thus for example, where amplifier 11 includes resonance circuit of large $\alpha$, the phase of the output voltage lags with respect to the phase of the input voltage. In this case, the phase shifter 13 is designed to include a phase advancing circuit.

Inherently, the ceramic element is a mechanically vibrating member having a resonance frequency of $n/2\,f_o$, as above described. For this reason, mere driving of the ceramic element results in the variation at the resonance frequency, thus greatly reducing the output power. To obviate this difficulty, a LC filter circuit or RC filter circuit of a relatively low value of $\alpha$ or a resonance circuit is included in the amplifier 11 to cause only longitudinal vibration of the ceramic element. This assures an efficient operation of the ceramic element. Inclusion of a resonance circuit in amplifier 11, however results in phase rotation thus causing the phase of the output voltage to advance with respect to the phase of the input voltage to the amplifier. In such a case, it is necessary to use a phase shifter having a phase delay characteristic.

Figure 8:
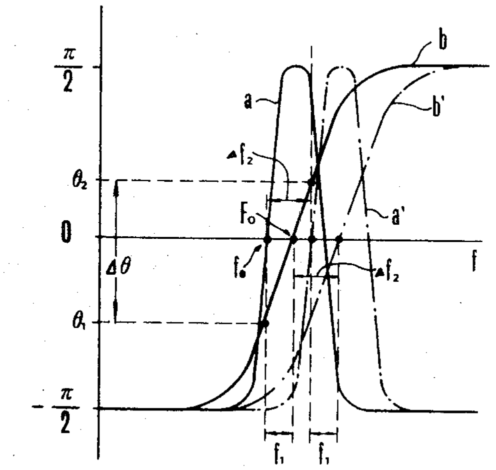
FIG. 8 is a graph showing the frequency-phase characteristics of a piezoelectric ceramic element and a phase shifter and is useful to explain the operation of the novel driving apparatus.

Also this arrangment can compensate for the variation in the resonance frequency of the piezoelectric ceramic element caused by temperature variation. In this case, phase shifter 13 can be composed of a circuit comprising an inductor L and a capacitor C or a circuit comprising a capacitor C and a resistor R (see FIG. 7). As the resonance frequency $f_o$ of the ceramic element 10 varies with temperature, a phase difference will be created between the driving voltage impressed across the ceramic element and the current flowing therethrough. This phase difference can be compensated for thus assuring the voltage and current to have the same phase since the circuit constant of phase shifter 13 varies in accordance with the temperature as will be described hereunder with reference to FIG. 8. As can be noted from characteristic curves *a* and *b* (curve *a* represents the frequency-phase characteristic of the ceramic member and curve *b* the frequency-phase characteristic of the phase shifter), at a given temperature, the center frequency $F_o$ of the phase shifter is shifted by $f_1$ from the resonace frequency $f_o$ of the ceramic element 10. Moreover, the phase shifter 13 is set such that it provides a phase delay $\theta_1$ with respect to the phase at the resonance frequency of the ceramic element.

When the ambient temperature rises the characteristic *a* of the ceramic element shifts to *a'* while the resonance frequency $f_o$ shifts to $f_o + \Delta f_2$ by an increment $\Delta f_2$. At the same time, the phase is varied to $\theta_2$ by an increment $\Delta\theta$. Due to this temperature variation, the characteristic of the phase shifter 13 is shifted from *b* to *b'* and its center frequency is shifted from $F_o$ to $\Delta f_2$. In other words, frequency difference between the resonance frequency $f_o$ and the center frequency $F_o$, or the amount of phase compensation $\theta_1$ is independent of the temperature variation. For this reason, it is possible to operate the ceramic element under the most suitable condition over a wide range of temperature variation.

Figure 9:
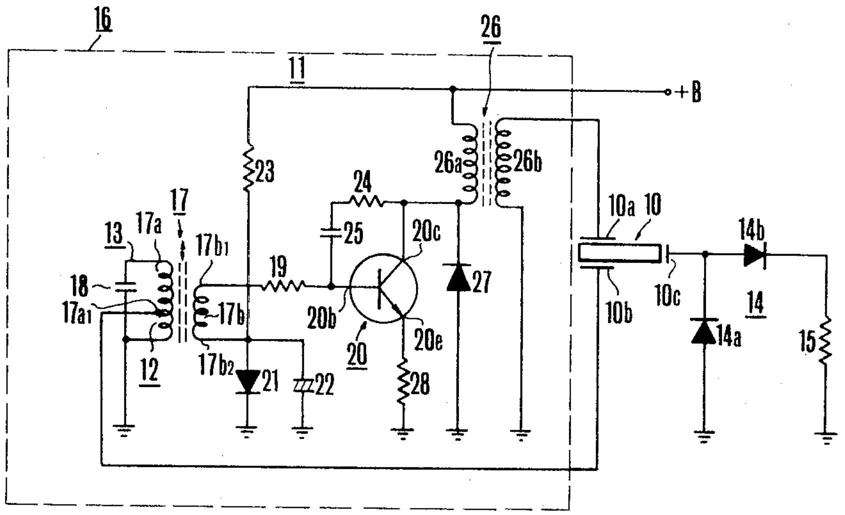
FIG. 9 shows a detailed connection diagram of the novel driving apparatus.

FIG. 9 shows the details of the novel driving apparatus 16 which is used to drive the piezoelectric ceramic element 10 acting as a solid state transformer for generating high voltage. Circuit elements corresponding to those shown is FIG. 6 are designated by the same reference numerals. Driving electrode 10*b* is connected to an intermediate tap $17a_1$ of the primary coil 17*a* of an input transformer 7 having primary and secondary coils 17*a* and 17*b* and a movable core 17*c* made of ferrite, for example, for adjusting the coupling between the primary and secondary coils as well as the inductances thereof. The part of the primary coil 17*a* above the intermediate tap 17*a*1 acts as part of the phase shifter 13 with the remainder of the primary coil 17*a* comprising the phase detector 12. The primary coil 17*a* is connected in parallel with a capacitor 18 having one end grounded. The upper part of primary coil 17*a* and capacitor 18 comprises phase shifter 13 and their values are selected to coincide the phases of the driving voltage impressed across the ceramic element 10 and of the current flowing therethrough. Fine adjustment of the phase is provided by the axial movement of core 17*c* of input transformer 17 for varying the inductance of the primary coil 17*a*. One terminal $17b_1$ of the secondary coil 17*b* of input transformer 17 is connected to the base electrode 20*b* of an excitation power transistor 20 for the ceramic element via a resistor 19. The other end $17b_2$ of the secondary coil 17*b* is grounded through a parallel combination of a biasing diode 21 and a by-pass capacitor 22. This end $17b_2$ is also connected to a source of direct current +B through a resistor 23. The collector electrode 20*c* of transistor 20 is connected to the base electrode 20*b* through a serially connected resistor 24 and capacitor 25. On the other hand, collector electrode 20*c* is connected to DC source +B via the primary winding of an output transformer 26 having primary and secondary windings 26*a* and 26*b*. Further, the collector electrode 20*c* is grounded through a damper diode 27. The emitter electrode 19*e* of transistor 19 is grounded through a stabilizing resistor 28.

Above described component elements constitute the amplifier 11 shown in FIG. 6. In this arrangment, the by-pass capacitor 22 is used for creating easy oscillation of amplifier 11 whereas resistors 19, 24 and capacitor 25 are used to suppress the self-oscillation of transistor 20.

As transistor 20 is used a suitable transistor having a high reverse breakdown voltage and a frequency characteristic permitting self-excited oscillation of about 60 $KH_z$. The damper diode 27 connected in the forward direction to the collector electrode 20*c* functions to absorb the reverse voltage caused by the leakage inductance of output transformer 26 whereby to prevent damage of transistor 20. One end of the secondary winding 26*b* of output transformer 26 is grounded whereas the other end is connected to the driving electrode 10*a* of the ceramic element 10.

Figure 10:
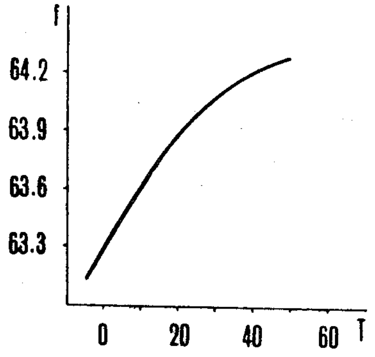
FIG. 10 is a plot showing a measured temperature-frequency characteristic of a piezoelectric ceramic element.

When the ambient temperature of the apparatus (the temperature of the enviornment in which the apparatus is located) varies, the resonance frequency $f$ ($KH_z$) of the ceramic element 10 increases with the increase in temperature as shown in FIG. 10. At this time, however, the characteristic of phase shifter 13 constituted by the primary coil 17*a* of input transformer 17 and capacitor 18 varies also in accordance with the variation in the characteristic of the ceramic element 10. More specifically, the inductance L of the primary coil 17*a* varies in accordance with the temperature characteristic of the core 17*c* of input transformer. In the same manner, the capacitance C of capacitor 18 varies to follow the temperature variation. Accordingly, it is possible to compensate for the temperature variation by designing the circuit constant of the phase shifter 13 to be consistent with the temperature characteristic of the ceramic member.

Figure 11:
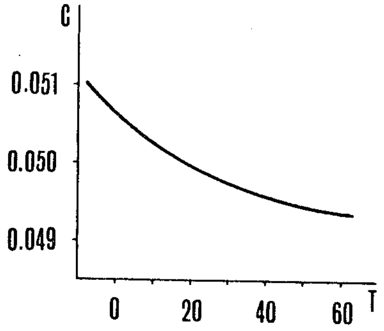
FIG. 11 is a plot showing a temperature-electrostatic capacitance characteristic of a capacitor utilized to constitute a phase shifter.

In an experiment utilizing the circuit shown in FIG. 9, the variation in inductance L with respect to the temperature variation was rather complicated so that the number of turns of the primary coil 17*a* was reduced as far as possible for the purpose of reducing inductance L and the capacitance of capacitor 18 was increased correspondingly. As a result, the resonance frequency of phase shifter 13 varied substantially in accordance with the temperature characteristic of capacitor 18. To this end, a capacitor was used whose electrostatic capacitance C (microfarad) decreases with the rise in temperature *t* (°C) as shown in FIG. 11.

Figure 12:
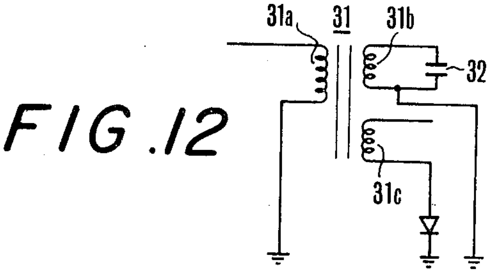
FIG. 12 shows a modified phase shifter and a modified phase detector.
Figure 13:
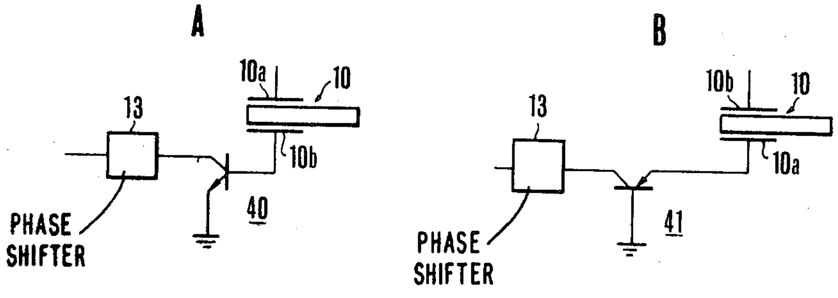
FIGS. 13A and 13B show still other modifications of the phase detector.

Although in the embodiment shown in FIG. 9, a two winding transformer was used to constitute the phase shifter and phase detector, it is to the understood that it is also possible to use a three winding transformer 31 as shown in FIG. 12. The coil 31*a* is used to comprise the phase detector 12, coil 31*b* to comprise the phase shifter 13 in combination with capacitor 32 and coil 31*c* is used to supply power to an amplifier, not shown, in the succeeding stage. Further, although phase detector 12 has been described as comprising a resistance element or a reactance element it may comprise an emitter grounded type transistor 40 having its base electrode directly connected to driving electrode 10*b* of the ceramic element and its collector connected to phase shifter 13, as shown in FIG. 13A. Alternatively, as shown in FIG. 13B, the phase detector may be constituted by a base grounded type transistor 41 with its emitter electrode connected directly to the driving electrode 10*b* of the ceramic member and the collector electrode to the phase shifter 13.

Although the invention has been described in connection with a piezoelectric ceramic element constructed to act as a high voltage generator, it will be clear that the novel driving apparatus can also be applied to a prizoelectric ceramic element acting as a source of ultransonic waves.

The invention is not limitted to the particular embodiments illustrated but many changes and modifications may be made without departing the scope of invention as defined in the accompanying claims.

What is claimed is:

1. Driving apparatus for driving a piezoelectric ceramic element including a pair of driving electrodes wherein a driving voltage is impressed across said driving electrodes for resonating said piezoelectric ceramic element at the natural frequency thereof, said driving apparatus comprising a phase detector connected to one of said driving electrodes for detecting the phase of the current flowing through said ceramic element as a voltage phase, an amplifier connected to the other driving electrode for supplying thereto a driving voltage, and a phase shifter to positively feed back the output from said phase detector to said amplifier for coinciding the voltage phase and the current phase of said ceramic element so as to drive said ceramic member at the most suitable driving frequency, said amplifier comprising an input transformer connected to the output of said phase detector, a transistor connected to the output of said transformer, an output transformer connected to the output of said transistor and means for connecting the driving electrodes of said piezoelectric ceramic element across the output of said output transformer.

2. Driving apparatus for driving a piezoelectric ceramic element including a pair of driving electrodes wherein a driving voltage is impressed across said driving electrodes for resonating said piezoelectric ceramic element at the natural frequency thereof, said driving apparatus comprising a phase detector connected to one of said driving electrodes for detecting the phase of the current flowing through said ceramic element as a voltage phase, an amplifier connected to the other driving electrode for supplying thereto a driving voltage, and a phase shifter to positively feed back the output from said phase detector to said amplifier for coinciding the voltage phase and the current phase of said ceramic element so as to drive said ceramic member at the most suitable driving frequency, said driving apparatus including a three winding transformer, a first winding thereof comprising said phase detector, a second winding comprising said phase shifter and a third winding being utilized as an output winding and connected to said amplifier, said phase shifter further including a capacitor connected to said second winding.

3. Driving apparatus for driving a piezoelectric ceramic element including a pair of driving electrodes wherein a driving voltage is impressed across said driving electrodes for resonating said piezoelectric ceramic element at the natural frequency thereof, said driving apparatus comprising a phase detector connected to one of said driving electrodes for detecting the phase of the current flowing through said ceramic element as a voltage phase, an amplifier connected to the other driving electrode for supplying thereto a driving voltage, and a phase shifter to positively feed back the output from said phase detector to said amplifier for coinciding the voltage phase and the current phase of said ceramic element so as to drive said ceramic member at the most suitable driving frequency, said phase detector comprising an emitter grounded type transistor, the base electrode thereof being connected directly to the driving electrode of said ceramic element and the collector electrode being utilized to derive an output and connected to said phase shifter.

4. Driving apparatus for driving a piezoelectric ceramic element including a pair of driving electrodes wherein a driving voltage is impressed across said driving electrodes for resonating said piezoelectric ceramic element at the natural frequency thereof, said driving apparatus comprising a phase detector connected to one of said driving electrodes for detecting the phase of the current flowing through said ceramic element as a voltage phase, an amplifier connected to the other driving electrode for supplying thereto a driving voltage, and a phase shifter to positively feed back the output from said phase detector to said amplifier for coinciding the voltage phase and the current phase of said ceramic element so as to drive said ceramic member at the most suitable driving frequency, said phase detector comprising a base grounded type transistor, the emitter electrode thereof being connected directly to the driving electrode of said ceramic element and the collector electrode being utilized to derive out an output and connected to said phase shifter.

5. Driving apparatus for driving a piezoelectric ceramic element including a pair of driving electrodes wherein a driving voltage is impressed across said driving electrodes for resonating said piezoelectric ceramic element at the natural frequency thereof, said driving apparatus comprising a phase detector connected to one of said driving electrodes for detecting the phase of the current flowing through said ceramic element as a voltage phase, an amplifier connected to the other driving electrode for supplying thereto a driving voltage, and a phase shifter to positively feed back the output from said phase detector to said amplifier for coinciding the voltage phase and the current phase of said ceramic element so as to drive said ceramic member at the most suitable driving frequency, said driving apparatus including a transformer whose secondary winding is connected to said amplifier and whose primary winding is provided with an intermediate top, said phase detector comprising one portion of said primary winding between said intermediate top and one end of said primary winding, said phase shifter comprising the other portion of said primary winding and a capacitor connected thereto.

6. Driving apparatus for driving a piezoelectric ceramic element including a pair of driving electrodes wherein a driving voltage is impressed across said driving electrodes for resonating said piezoelectric ceramic element at the natural frequency thereof, said driving apparatus comprising a phase detector connected to one of said driving electrodes for detecting the phase of the current flowing through said ceramic element as a voltage phase, an amplifier connected to the other driving electrode for supplying thereto a driving voltage, and a phase shifter to positively feed back the output from said phase detector to said amplifier for coinciding the voltage phase and the current phase of said ceramic element so as to drive said ceramic member at the most suitable driving frequency, said phase shifter having a center frequency which shifts in response to temperature variations in the environment of said apparatus to compensate for the effect of said temperature variations on the resonance frequency of said piezoelectric ceramic element.

7. The driving apparatus as recited in claim 6 wherein said phase shifter comprises a resonance circuit including a capacitor and an inductor connected thereto, the resonant frequency of said resonance circuit varying substantially in accordance with the effect of said temperature variations on said capacitor.

8. The driving apparatus as recited in claim 6 wherein said phase shifter comprises a resonance circuit including a capacitor and an inductor connected thereto, the resonant frequency of said resonance circuit varying in dependence on the effect of said temperature variations on said inductor.

* * * * *

PO-1050
(5/69)
10/69

UNITED STATES PATENT OFFICE
CERTIFICATE OF CORRECTION

Patent No. 3,743,868 Dated July 3, 1973

Inventor(s) Takehiko Kawada

It is certified that error appears in the above-identified patent and that said Letters Patent are hereby corrected as shown below:

Column 2, line 39, "piezoelectric element" should read -- piezoelectric ceramic element --.

Column 4, lines 26,27, "to set the(phase shift)" should read -- to set the θ phase shift --.

Claim 5, lines 45 and 47, change "top" to -- tap --.

Signed and sealed this 9th day of July 1974.

(SEAL)
Attest:

McCOY M. GIBSON, JR.
Attesting Officer

C. MARSHALL DANN
Commissioner of Patents